United States Patent
Lackner et al.

(10) Patent No.: US 12,343,674 B2
(45) Date of Patent: *Jul. 1, 2025

(54) SYSTEM AND METHOD FOR PASSIVE COLLECTION OF ATMOSPHERIC CARBON DIOXIDE

(71) Applicant: ARIZONA BOARD OF REGENTS ON BEHALF OF ARIZONA STATE UNIVERSITY, Scottsdale, AZ (US)

(72) Inventors: Klaus Lackner, Longmont, CO (US); Shreyans Kedia, Tempe, AZ (US); Brinton Carlson, Turlock, CA (US); Robert Page, Phoenix, AZ (US); Venkatram Choodamani, Tempe, AZ (US); Allen Wright, Gilbert, AZ (US)

(73) Assignee: Arizona Board of Regents on Behalf of Arizona State University, Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/349,866

(22) Filed: Jul. 10, 2023

(65) Prior Publication Data
US 2023/0347278 A1 Nov. 2, 2023

Related U.S. Application Data

(63) Continuation of application No. 16/975,110, filed as application No. PCT/US2019/019053 on Feb. 21, 2019, now Pat. No. 11,738,300.
(Continued)

(51) Int. Cl.
*B01D 53/14* (2006.01)
*B01D 53/04* (2006.01)
(Continued)

(52) U.S. Cl.
CPC ............ *B01D 53/08* (2013.01); *B01D 53/04* (2013.01); *B01D 2257/504* (2013.01);
(Continued)

(58) Field of Classification Search
CPC ........ B01D 53/08; B01D 53/04; B01D 53/06; B01D 53/1475; B01D 2257/504;
(Continued)

(56) References Cited

U.S. PATENT DOCUMENTS 2,694,605 A 11/1954 Berg
6,521,026 B1 2/2003 Goto
(Continued)

FOREIGN PATENT DOCUMENTS

EP 3873646 A1 9/2021
WO 2010107942 A1 9/2010
WO 2016164781 A1 10/2016

OTHER PUBLICATIONS

Lackner, Klaus S. "Washing carbon out of the air." Scientific American vol. 302,6 (2010): 66-71. doi:10.1038/scientificamerican0610-66.

*Primary Examiner* — Frank M Lawrence, Jr.
(74) *Attorney, Agent, or Firm* — FULLER IP LAW LLC; Rodney J. Fuller

(57) ABSTRACT

A system and method for passive collection of atmospheric carbon dioxide is disclosed. The system includes a harvest chamber having a first opening and a sorbent regeneration system. The system also includes a capture body coupled to and movable by a support structure. The capture body includes a sorbent material and is movable by the support structure to be in a collection configuration wherein at least a portion of the capture body is in contact with a natural airflow outside the harvest chamber such that atmospheric carbon dioxide is captured by the sorbent material, and a
(Continued)

release configuration wherein at least a portion of the capture body holding captured carbon dioxide is operated upon by the regeneration system inside the harvest chamber such that captured carbon dioxide is released to form an enriched gas.

18 Claims, 10 Drawing Sheets

Related U.S. Application Data

(60) Provisional application No. 62/634,135, filed on Feb. 22, 2018.

(51) Int. Cl.
*B01D 53/08* (2006.01)
*B01D 53/62* (2006.01)

(52) U.S. Cl.
CPC .............. *B01D 2259/40086* (2013.01); *B01D 2259/4009* (2013.01); *B01D 2259/40092* (2013.01)

(58) Field of Classification Search
CPC .. B01D 2259/40086; B01D 2259/4009; B01D 2259/40092; B01D 2252/10; B01D 2252/20; B01D 2259/40096; B01D 2258/06; B01D 2259/40094; B01D 2259/40098; B01D 46/0052; Y02C 20/40
USPC .......... 96/268–270, 288, 110, 113, 123, 150, 96/143–146; 95/19, 23, 107, 111, 112, 95/130, 236; 423/220, 230
See application file for complete search history.

(56) References Cited

U.S. PATENT DOCUMENTS

| | | | |
|---|---|---|---|
| 11,738,300 B2* | 8/2023 | Lackner | B01D 53/04 95/21 |
| 2011/0293503 A1 | 12/2011 | Wright et al. | |
| 2012/0152116 A1 | 6/2012 | Barclay et al. | |
| 2012/0302469 A1 | 11/2012 | Lackner et al. | |
| 2017/0361271 A1* | 12/2017 | Eisenberger | B01J 20/3425 |
| 2018/0169562 A1 | 6/2018 | Hilbig et al. | |
| 2019/0193019 A1 | 6/2019 | Okano | |
| 2021/0387133 A1* | 12/2021 | Lackner | B01D 53/0438 |
| 2023/0119882 A1* | 4/2023 | Lackner | B01D 53/06 96/125 |
| 2023/0415090 A1* | 12/2023 | Lackner | B01D 53/62 |
| 2024/0091698 A1* | 3/2024 | Lackner | B01D 53/0407 |

* cited by examiner

SYSTEM AND METHOD FOR PASSIVE COLLECTION OF ATMOSPHERIC CARBON DIOXIDE

RELATED APPLICATIONS

This application is a Continuation of U.S. patent application Ser. No. 16/975,110, filed Aug. 21, 2020 (published as US20200398214), which is the U.S. National Stage of International Patent Application No. PCT/US2019/019053, filed Feb. 21, 2019, which claims the benefit of U.S. provisional patent application 62/634,135, filed Feb. 22, 2018 titled "Systems for Passive Collection of Atmospheric Carbon Dioxide," the contents of each of which are incorporated herein by reference in their entireties.

TECHNICAL FIELD

Aspects of this document relate generally to the passive collection of atmospheric carbon dioxide.

BACKGROUND

The need for technologies to remove carbon dioxide from ambient air has been well established. In addition to conservation, reduced-carbon processes, and on-site capture efforts, a significant amount of carbon dioxide will need to be removed from the atmosphere to avoid a looming climate change crisis. Nevertheless, the technologies are still new and the early air capture processes require large amounts of energy to operate. Since the carbon dioxide in the ambient air is very dilute, atmospheric $CO_2$ collectors can quickly overrun a tight energy budget for drawing in and processing air in bulk. Additionally, conventional carbon dioxide collection systems often exhibit the unfortunate combination of being costly and fragile. Conventional capture devices also often have a large initial capital cost along with a high operating cost.

SUMMARY

According to one aspect, a system for passive collection of atmospheric carbon dioxide includes a harvest chamber having a first opening and a sorbent regeneration system including a release medium, a release medium emitter, and a liquid extractor. The system also includes a capture body coupled to and movable by a support structure. The support structure has at least a first portion inside of the harvest chamber and a second portion outside of and above the harvest chamber at a height. The capture body includes a sorbent material and is movable by the support structure to be in a collection configuration wherein at least a portion of the capture body able to capture carbon dioxide is in contact with a natural airflow outside the harvest chamber such that atmospheric carbon dioxide is captured by the sorbent material, and a release configuration wherein at least a portion of the capture body holding captured carbon dioxide is in contact with the release medium inside the harvest chamber such that captured carbon dioxide is released into the harvest chamber to form an enriched gas. The system also includes a product outlet in fluid communication with the inside of the harvest chamber and configured to receive a product stream of enriched gas displaced by a sweep gas inside the harvest chamber. The sweep gas is introduced to the harvest chamber. Finally, the system for passive collection of atmospheric carbon dioxide includes a control system communicatively coupled to the support structure, and configured to cycle the capture body through the collection configuration and the release configuration.

Particular embodiments may comprise one or more of the following features. The release medium may be steam and the sorbent material may be one of a moisture swing sorbent material and a heat swing sorbent material. The capture body may be a closed-loop belt having a flexible substrate upon which the sorbent material is disposed. The first and second portions of the support structure may each comprise a plurality of rollers. At least one of the rollers of the support structure may be coupled to a motor communicatively coupled to the control system. The capture body may be able to be in the collection configuration and the release configuration simultaneously. The first opening of the harvest chamber may be a liquid trap having an external aperture exposed to the atmosphere and/or an internal aperture below the external aperture and submerged under water such that the water separates the inside of the harvest chamber from the external aperture. The internal and external apertures may be connected by a conduit. The first opening may be an open channel having at least one flow generator communicatively coupled to the control system. The control system may be communicatively coupled to a sensor that may be one of a pressure sensor, a flow speed sensor, and a mass flow sensor. The control system may be configured to operate the at least one flow generator in response to sensor readings such that an average flow rate across the channel may be maintained at a desired flow rate to create a dynamic air lock. The harvest chamber may further include a second opening. The closed-loop belt may enter the harvest chamber through the first opening and may exit the harvest chamber through the second opening. The product outlet may be opposite the second opening and proximate the first opening. The first and second portions of the support structure may each include an upper rack of rollers and/or a lower rack of roller. For each of the first and second portions of the support structure, the closed-loop belt may be woven back and forth between the upper rack of rollers and the lower rack of rollers. The support structure may include a lid movable between an open position above and separated from the harvest chamber, and a closed position wherein the lid covers the first opening of the harvest chamber. The support structure may further include a collapsible tether coupled to an interior of the harvest chamber and the lid. The capture body may include a plurality of plates coupled to and spaced out along the collapsible tether such that the plurality of plates hangs from the lid by the tether when the capture body is in the collection configuration and the plurality of plates are enclosed within the harvest chamber when the capture body is in the release configuration. Each plate may include the sorbent material. Lastly, the sweep gas may be atmospheric air.

According to another aspect of the disclosure, a system for passive collection of atmospheric carbon dioxide includes a harvest chamber having a first opening and a sorbent regeneration system. The system further includes a capture body coupled to and movable by a support structure. The support structure has at least a first portion inside of the harvest chamber and a second portion outside of the harvest chamber. The capture body includes a sorbent material and is movable by the support structure to be in a collection configuration wherein at least a portion of the capture body able to capture carbon dioxide is in contact with an airflow outside the harvest chamber such that atmospheric carbon dioxide is captured by the sorbent material, and a release configuration wherein at least a portion of the capture body holding captured carbon dioxide is operated upon by the sorbent regeneration system inside the harvest chamber such that captured carbon dioxide is released into the harvest chamber to form an enriched gas. The system also includes a product outlet in fluid communication with the inside of the harvest chamber and configured to receive a product stream of enriched gas displaced by a sweep gas inside the harvest chamber. The sweep gas is introduced to the harvest chamber. Lastly, the system for passive collection of atmospheric carbon dioxide includes a control system communicatively coupled to the support structure, and configured to cycle the capture body between the collection configuration and the release configuration.

Particular embodiments may comprise one or more of the following features. The sorbent material may be a moisture swing sorbent material. The sorbent regeneration system may include a release medium, a release medium emitter, and/or a liquid extractor. The release medium may be one of liquid water and steam. The sorbent material may be a heat swing sorbent material and the sorbent regeneration system may include a heat source. The second portion of the support structure may be positioned above the harvest chamber at a height. The height may be adjustable. The support structure may include a lid movable between an open position above and separated from the harvest chamber, and a closed position covering the first opening of the harvest chamber. The capture body may be coupled to the lid and an interior of the harvest chamber such that the capture body hangs from the lid when the capture body is in the collection configuration and the capture body is enclosed within the harvest chamber when the capture body is in the release configuration. The support structure may further include a collapsible tether coupled to the interior of the harvest chamber and the lid. The capture body may be coupled to the lid through the collapsible tether. The capture body may include a plurality of plates coupled to and spaced out along the collapsible tether. Each plate may include the sorbent material. The system may also include an external sensor outside the harvest chamber communicatively coupled to the control system. The control system may be configured to automatically modify at least one of a ratio of closed-loop belt inside the harvest chamber to closed-loop belt outside the harvest chamber and/or a belt speed in response to an ambient condition detected by the external sensor.

According to yet another aspect of the disclosure, a method for passively collecting atmospheric carbon dioxide includes exposing at least a portion of a capture body able to capture carbon dioxide to a natural airflow. The capture body includes a sorbent material that captures atmospheric carbon dioxide upon contact. The method also includes moving the at least a portion of the capture body holding captured carbon dioxide into a harvest chamber using a support structure coupled to the capture body and driven by a control system communicatively coupled to the support structure. The portion of the capture body holding captured carbon dioxide enters the harvest chamber through a first opening of the harvest chamber. The method further includes regenerating the sorbent material and releasing the captured carbon dioxide into the harvest chamber to form an enriched gas by exposing the sorbent material to a release medium introduced to the harvest chamber by a release medium emitter, the release medium being one of liquid water and steam. The method also includes extracting the release medium in liquid form from the harvest chamber using a liquid extractor, removing a product stream of enriched gas from the harvest chamber through a product outlet by displacing the enriched gas with a sweep gas, and removing the at least a portion of the capture body now having regenerated sorbent material from the harvest chamber by driving the support structure with the control system.

Particular embodiments may comprise one or more of the following features. The method may also include maintaining an average flow rate across the first opening at a desired flow rate to create a dynamic air lock by operating at least one flow generator proximate the first opening using the control system and in response to a sensor reading from a sensor communicatively coupled to the control system. The first opening may be an open channel. The sensor may be one of a pressure sensor, a flow speed sensor, and a mass flow sensor. The desired flow rate maintained at the first opening may account for the sweep gas introduced to the harvest chamber. The desired flow rate maintained at the first opening may be substantially zero. The at least one flow generator may include a drag belt moving along a wall of the open channel to generate flow in a direction the drag belt is moving. The at least one flow generator may be a blower.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1A:
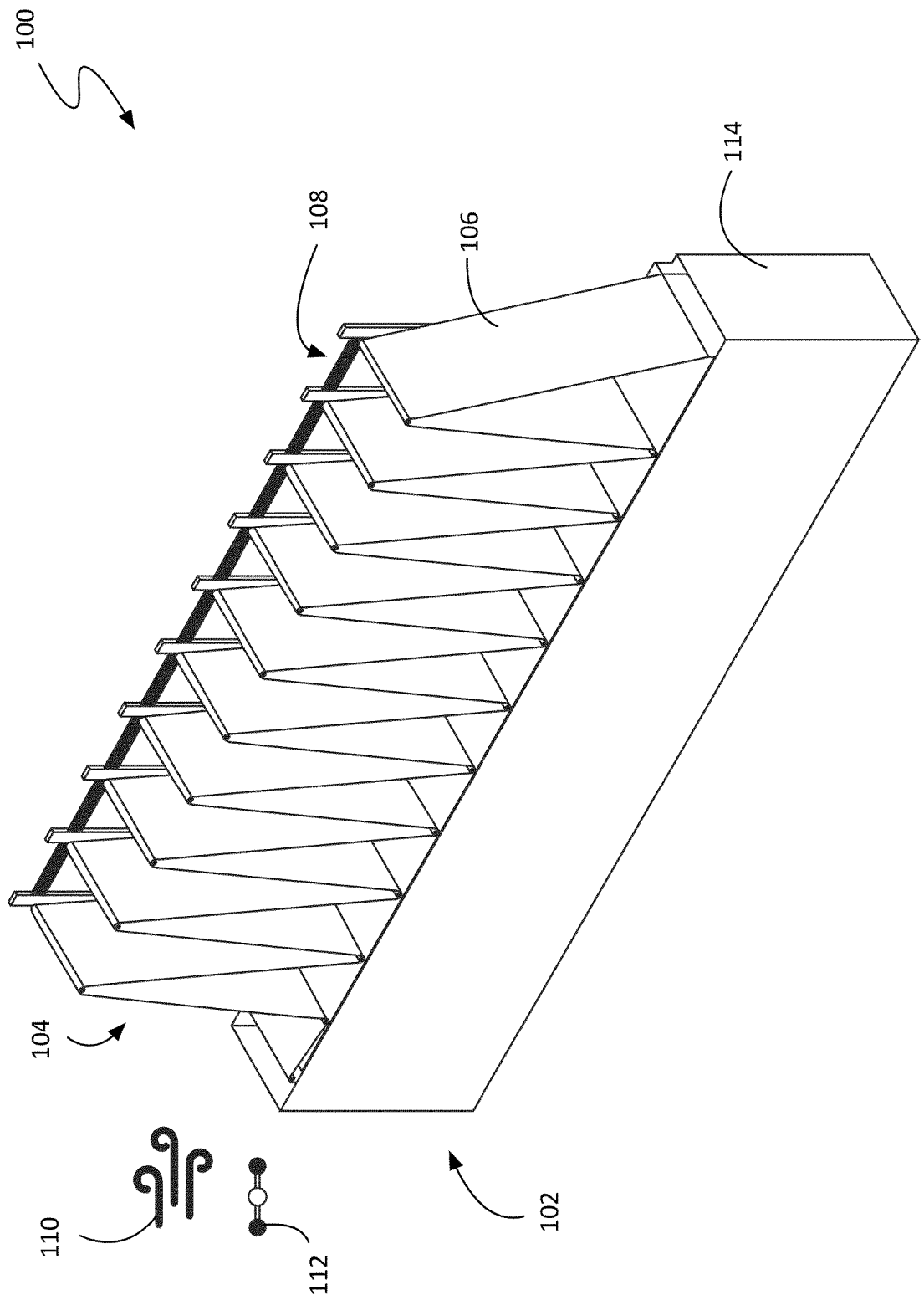
FIGS. 1a and 1b are perspective views of a system for passive collection of atmospheric carbon dioxide.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

In addition to conservation, reduced-carbon processes, and on-site capture efforts, a significant amount of carbon dioxide will need to be removed from the atmosphere to avoid a looming climate change crisis. Captured atmospheric carbon dioxide may be sequestered to off-set other carbon emissions, or processed as part of material, agricultural, or food applications. Sequestration methods include but are not limited to the following examples: geological sequestration (e.g. the injection of compressed $CO_2$ into underground formations, etc.), mineral sequestration (e.g. methods of carbon storage that transform $CO_2$ into mineral carbonates, etc.), disposal as biochar or other forms of solid carbon, and injection into the ocean. Examples of material applications include but are not limited to: fuel production, and feed stocks for plastics or higher value organic materials. Agricultural and food applications include, but are not limited to, the use of $CO_2$ for photosynthetic processes (e.g. in greenhouses, algae ponds, etc.), the use of $CO_2$ as preservative, use as a fire suppressant (e.g. in a grain silo, etc.), use for refrigeration in food processing, and the like.

Because $CO_2$ in the air is very dilute (400 parts per million by volume), $CO_2$ collectors must not invest a significant amount of energy to draw in bulk air. Heating or cooling the air, drying the air, or significantly changing the air pressure would exceed any reasonable energy budget. Furthermore, conventional collection systems tend to exhibit the unfortunate combination of being costly and fragile. Conventional capture systems often have a large initial capital cost along with a high operating cost.

Contemplated herein are systems and methods for passive collection of atmospheric carbon dioxide that avoid the use of fans and blowers to capture from the ambient air in bulk. Instead, the systems and methods contemplated herein rely on wind and other natural air flows. In addition to having low energy requirements, these systems are also durable and easily adapted to a variety of harvesting conditions.

As will be discussed in detail below, some embodiments of the passive collection system operate continuously, while other embodiments operate in batches. Systems operated in a continuous manner are advantageous over other systems in terms of energy cost and adaptability. However, such systems may be difficult to optimize for harvesting airflows from multiple directions (e.g. efficiency may be poor for certain vectors), something for which batch systems are well suited.

Figure 1B:
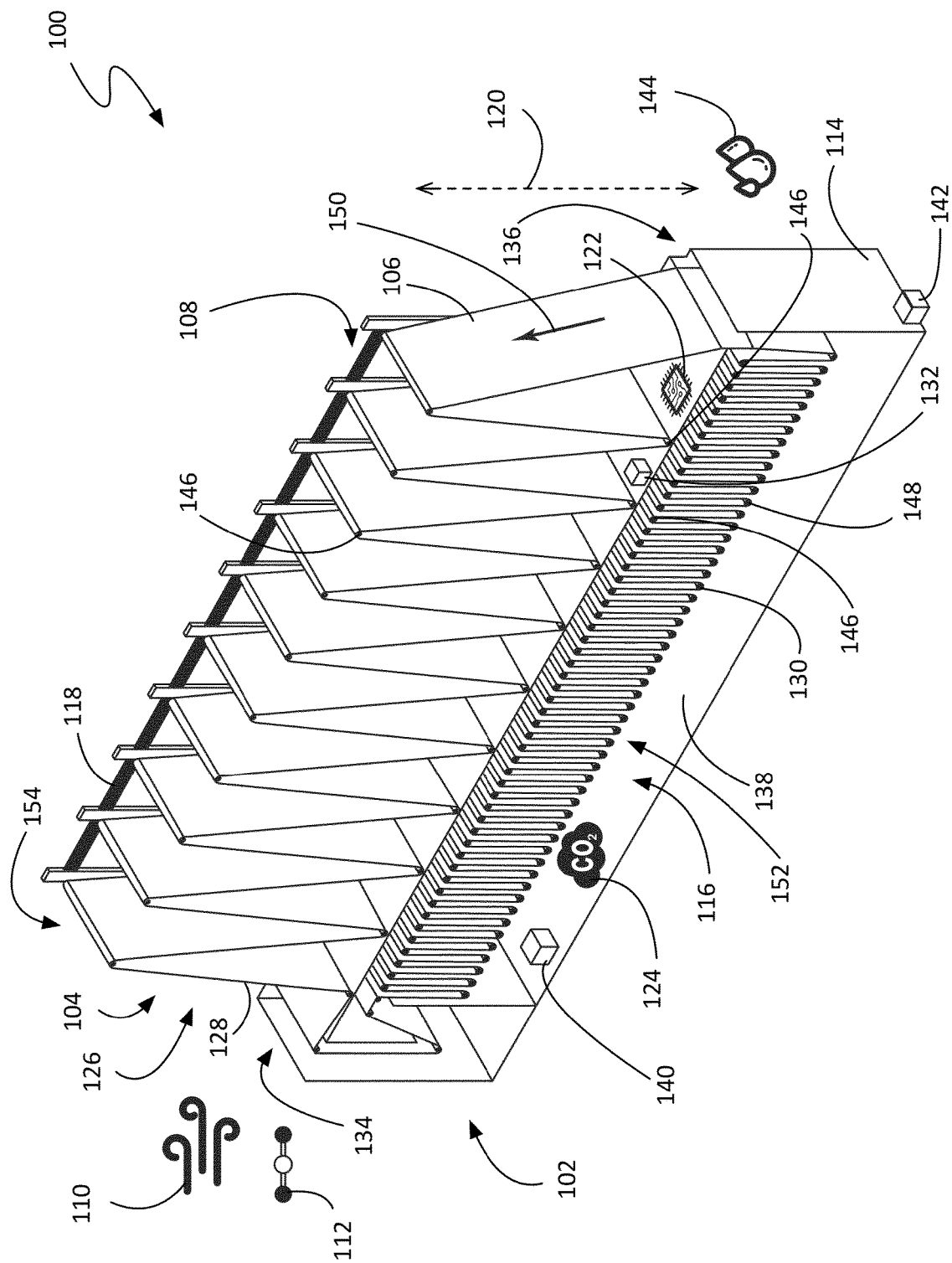

FIGS. 1a and 1b are perspective views of a non-limiting example of a system 100 for passive collection of atmospheric carbon dioxide (hereinafter "passive collection system", "collection system", or just "system"). Specifically, FIG. 1a is a perspective view, and FIG. 1B is the same view, with the side of the harvest chamber 102 removed to provide an internal view. According to various embodiments, the system 100 comprises a harvest chamber 102, a capture body 104 comprising a sorbent material 106, a support structure 108, a sorbent regeneration system 140, a control system 122, and at least a first opening 134.

In the context of the present description and the claims that follow, a harvest chamber 102 is an enclosure having an exterior 114 and an interior 138 within which captured carbon dioxide is released for subsequent sequestration or application. The harvest chamber 102 has at least one opening, first opening 134, through which it receives captured carbon dioxide and the material in which it is captured (e.g. the capture body 104 and its sorbent material 106, etc.).

In some embodiments, the harvest chamber 102 may also have a second opening 136, and still other embodiments, the harvest chamber 102 may have even more openings. In some embodiments, the first opening 134 and/or the second opening 136 may simply be an aperture in a wall of the harvest chamber 102, while in other embodiments the first opening 134 and/or the second opening 136 may comprise a channel or conduit connecting the exterior 114 with the interior 138. In some embodiments, the channel may have a depth that is longer than at least one of its length and width, creating an environment not possible with an aperture in a thin wall.

In some embodiments, the first opening 134 may remain open during operation of the system 100 (e.g. continuous operation), while in other embodiments the first opening 134 may be periodically covered, or even sealed, during the operation of the system 100 (e.g. batch operation). Both modes of operation will be discussed further, below.

The harvest chamber 102 may be constructed of a durable material appropriate for both the external environment in which the system 100 is being employed, as well as the internal environment (e.g. the nature of the sorbent regeneration system 140, etc.). In some embodiments, the harvest chamber 102 may be a repurposed shipping container.

In the context of the present description and the claims that follow, a capture body 104 is the structure or collection of structures upon which, or in which, the $CO_2$ is captured. The capture body 104 comprises a sorbent material 106 responsible for the capture of carbon dioxide. In some embodiments, the sorbent material 106 may be disposed on one or more surfaces of the capture body 104, while in other embodiments, the capture body 104 itself may be made of sorbent material 106. As will be discussed below, the sorbent material 106 releases captured $CO_2$ when it is regenerated (e.g. upon application of a sorbent regeneration system 140 inside the harvest chamber 102, etc.).

According to various embodiments, the capture body 104 is coupled to, and movable by, a support structure 108. In the context of the present description and the claims that follow, a support structure 108 is a structure configured to hold the capture body 104 in an arrangement suitable for collecting atmospheric carbon dioxide (e.g. a collection configuration 300), and further configured to move the capture body 104 such that captured $CO_2$ may be released into the harvest chamber 102 as the sorbent material 106 is regenerated (e.g. a release configuration 304). According to various embodiments, the support structure 108 may have a first portion 116 that is inside of the harvest chamber 102, and a second portion 118 that is outside of the harvest chamber 102. In some embodiments, the second portion 118 may also be positioned above the harvest chamber 102 at a height 120.

In some embodiments, the support structure 108 may be attached to, or even integral with, the harvest chamber 102. In other embodiments, the support structure 108 may be separate from the harvest chamber 102. The support structure 108 may move the capture body 104 using various methods and devices, including but not limited to, motors, rollers, linear actuators, pistons, screw drives, lifts, and other devices known in the art.

The control system 122 is responsible for the cyclical operation of the system 100. In the context of the present description and the claims that follow, the control system 122 is a device capable of executing a series of predefined instructions to cause the system 100 to operate in a cyclical manner, capturing $CO_2$ from the atmosphere and releasing it within the harvest chamber 102. Examples include, but are not limited to, embedded systems, conventional computer systems, mobile devices, and the like. The control system 122 is communicatively coupled with the various components that either provide information (e.g. sensors, etc.) or perform actions (e.g. the support structure 108, the sorbent regeneration system 140, etc.). In some embodiments, the control system 122 may be responsible for additional functions. As will be discussed further in the context of FIGS. 3a and 3b, in some embodiments the control system 122 may provide automation for the system 100 that allows it to run unattended.

In operation, the system 100 exposes the capture body 104, or at least a portion of the capture body 104, to a natural air flow 110 (e.g. wind, etc.) outside of the harvest chamber 102. Atmospheric carbon dioxide 112 is captured by the sorbent material 106 of the capture body 104 on contact. The portion of the capture body 104 (or the entire body, in some embodiments) holding captured $CO_2$ is then moved into the harvest chamber 102 through the first opening 134 by the support structure 108 which is driven by the control system 122. Next, the sorbent material 106 is regenerated by the sorbent regeneration system 140 inside of the harvest chamber 102, releasing the captured $CO_2$ to mix with the gas inside the harvest chamber 102 to form an enriched gas 124 (i.e. a gas enriched with $CO_2$). The enriched gas 124 is removed from the harvest chamber 102 to become a product stream, and the regenerated capture body 104 is moved back outside the chamber 102 to capture more atmospheric carbon dioxide and begin the cycle again.

The system 100 can be used with a wide range of different sorbents 106 that can be regenerated by various means, including solid sorbents and liquid sorbents. The sorbents 106 can be made from inorganic materials or from organic materials, and may also be composites. Sorbents 106 could be materials that bind $CO_2$ chemically or physically, i.e., they could be absorbers. They could also be adsorbents that bind $CO_2$ on internal surfaces, (e.g. inside porous structures, on fiber surfaces, etc.). Examples of regeneration methods for a sorbent material 106 include, but are not limited to, a moisture swing, a thermal swing, a vacuum swing, or in a combination of these approaches. The above discussion of different sorbents 106 is meant to exemplify the options, rather than provide an exhaustive description. Other sorbent-based technologies that can be provided by those skilled in the art, may be adapted for use in the collection system 100.

The sorbent material 106 can be selective for a single sorbate or interact with multiple sorbates that cooperate or compete with each other. Sorbents 106 could be autocatalyzing their own absorption. As a specific example, some embodiments may employ sorbents 106 for which the sorbent's affinity to $CO_2$ can be controlled by moisture. In some cases, the presence of moisture will increase the binding of $CO_2$ to the sorbent 106, while in other cases it will reduce it. One particular class of sorbents, which are known as moisture swing sorbents, bind $CO_2$ under dry conditions and release it again when made wet. Some moisture swing sorbents, as for example, polystyrenes with quaternary ammonium ions, respond strongly to relative humidity. This means that the impact of raising the temperature of the surrounding air increases the loading of the sorbent with $CO_2$ as the associated reduction in relative humidity decreases the Gibbs free energy of sorption more than it is raised by the increase in temperature. However, if warming occurs at a constant relative humidity, for example 100% relative humidity, or wet conditions, then heating the sorbent will drive $CO_2$ off the sorbent. Therefore, moisture swing sorbents can be used with moisture alone, or with a combination of moisture (water, fog or other droplet forms, or vapor), temperature, and pressure. In some embodiments, the use of such a versatile sorbent may be optimized by the control system 122 using algorithms that choose the regeneration pathway based on efficiency in light of ambient conditions.

Apart from a few specific examples directed to specific modes of operation, the preceding discussion of the elements and operation of a collection system 100 may be applicable to systems 100 that are either continuous or batch. The following will focus more on specific operation modes. For example, FIGS. 1a and 1b are perspective views of a non-limiting example of a system 100 configured for continuous operation.

According to various embodiments, the capture body 104 may be a closed-loop belt 126 that enters the harvest chamber 102 through the first opening 134. In some embodiments, the belt 126 exits the harvest chamber 102 through a second opening 136, while in other embodiments the belt 126 may exit the harvest chamber 102 through the same opening by which it entered (i.e. the first opening 134).

The belt 126 moves in a closed loop across a series of rollers 130, at least one of which is driven by the control system 122 (e.g. coupled to a motor 132, etc.). The belt 126 may be composed of a fabric or similarly flexible material or substrate 128. According to various embodiments, the belt 126 may comprise a sorbent material 106. Natural air flow or wind is used to expose the belt 126 to ambient $CO_2$ 112. According to various embodiments, continuous operation allows for reduced energy cost. Furthermore, these systems 100 are flexible and may be adapted to function optimally in varying weather and climate conditions.

The dominant component of the enriched gas 124 in the harvest chamber 102 is air, but the $CO_2$ concentration is raised from the ambient levels of about 0.04% to several percent. Another way to look at this is that the process removes roughly 99% of the air from the gas mixture that contains the $CO_2$.

In some embodiments, the belt material may be a simple fabric, which could be from active sorbent material 106 or have active sorbent material 106 embedded into it. In some embodiments, the fabric material may be a woven fabric, while in others it may be a felt-like material. In some embodiments, the belt 126 may be made from a plastic-type material. The belt 126 may be made of a mesh, having channels that pass through it. In some embodiments, the belt 126 may be a composite, analogous to a rug having fibers sticking out on both sides that can absorb $CO_2$. The belt 126 may be made from parallel slats of material that are attached to each other. In some embodiments, the belt 126 may contain stiffening ribs.

According to various embodiments, the rollers 130 only touch parts of the belt 126 designed for contact. The belt 126 may consist of a "tough layer" designed to come in contact with the rollers 130. These contact areas may include the two outside edges of the belt 126, but in some embodiments might include one or more strips in the middle of the belt 126. The forces holding the belt 126 onto the rollers 130 may be adjusted to be large enough to allow the belt 126 to move forward without slipping providing enough tension to prevent the belt 126 from sagging into undesired areas. Some sorbents are sensitive to UV light. In some embodiments, only one side of the belt 126 (i.e. the side facing downward) may comprise the sorbent material 106, reducing the cost of the system. In other embodiments, the support structure 108 may comprise some form of shade to shield the exposed sorbent material 106 from direct sunlight.

In some embodiments, the belt may fold like fan-fold paper into a stack, which may be arranged vertically, where an incoming section is added to the "top of the stack" and an outgoing section is removed from the "bottom of the stack." In such a design, the whole stack is slowly sliding through the harvest chamber 102 for regeneration and air slowly flows through the stack as it moves through the atmosphere.

In some embodiments, one or both portions of the support structure 108 may comprise two sets or racks of rollers, an upper rack 146 and a lower rack 148 between which the belt 126 is woven back and forth in a zigzag path. The belt path may be designed in a fashion that the fraction of length of the belt 126 in the chamber 102 can vary from a very small portion of the length of the belt 126 to nearly the entire length of the belt 126. According to some embodiments, the portion of the belt 126 outside the chamber 102 may move from the second opening 136 of the harvest chamber 102 in zigzag path, alternatingly over a top roller and under a bottom roller, and eventually back into the first opening 134 of the harvest chamber 102. In some embodiments, the height 120 of the top rollers outside the chamber 102 may be adjusted, either collectively or individually, until they come down to the level of the bottom rollers. Lowering all or some of the top rollers makes it possible to shorten the length of the belt-section exposed to the atmosphere.

In another embodiment, the bottom rollers may be idlers and maintain tension in the belt 126 through their weight, while a speed differential between individually-driven top rollers controls the length of the belt 126 between two top rollers. In such embodiments, the top rollers may all be at the same height 120. Said height 120 may be fixed in some embodiments, while in others the top rollers may move up or down to minimize the exposure of the belt 126, when so desired. For example, during high winds the belt 126 may need to be protected inside the harvest chamber 102. Even if the height 120 of the top rollers is fixed the total length of the exposed belt section can be adjusted if the height of the bottom rollers changes.

The belt 126 in the harvest chamber 102 may move over a large number of top and bottom rollers that also can adjust their relative distance to adjust the amount of belt 126 that is inside the harvest chamber 102, according to various embodiments. Some embodiments may have two racks of rollers, an upper rack 146 and a lower rack 148, and the belt 126 may move in a zigzag fashion alternating between going over a top roller and going below a bottom roller. The total length of belt 126 in the chamber may be varied by having one or both racks move. When the two racks reach their maximum distance nearly all the belt is inside the harvest chamber 102.

According to various embodiments, some or all of the rollers 130 in the system may be driven (e.g. coupled to a motor 132, etc.). Driven rollers 130 can maintain a speed differential, to accommodate an increase or decrease in the distance between rollers 130. In other embodiments, all of the rollers 130 may be passive.

In some embodiments, the control system 122 may be used to ensure that the total belt 126 is under tension, while also allowing the ratio of the belt 126 inside and outside the harvest chamber 102 to be changed. For example, if ambient conditions 144 (as determined by an external sensor 142 communicatively coupled to the control system 122) allow for fast uptake, a larger fraction of the belt may be kept in the harvest chamber 102, and the belt speed 150 may be increased. If ambient conditions 144 are less favorable, the control system 122 may slow down the belt 126 and a smaller fraction of the belt 126 is inside the harvest chamber 102. Conversely, if conditions in the harvest chamber 102 improve (e.g. temperatures increase, etc.) the control system 122 may speed up the belt 126 and maintain a larger fraction inside the harvest chamber 102. If wind conditions threaten to exceed the maximum allowable wind force on the belt 126, the belt 126 left outside may first be reduced, to reduce wind drag, and if necessary the exposure to the weather may be nearly completely eliminated by completely lowering the belt 126, according to various embodiments. If other weather conditions require protection of the belt 126 (e.g. a sandstorm, etc.) the belt 126 can also be retracted into the harvest chamber 102, according to some embodiments. The control system 122 will be discussed further with respect to FIGS. 3a and 3b, below.

Controls for moving the belt 126 and allocating it between inside and outside act on the individual motorized rollers 130 in the system 100. In some embodiments, rollers 130 may consist of a central shaft and two or more sections that come in direct contact with parts of the belt 126. The contact with the belt 126 may be simple friction, or may involve teeth that match holes in the edge or rib of the belt 126.

Figure 2A:
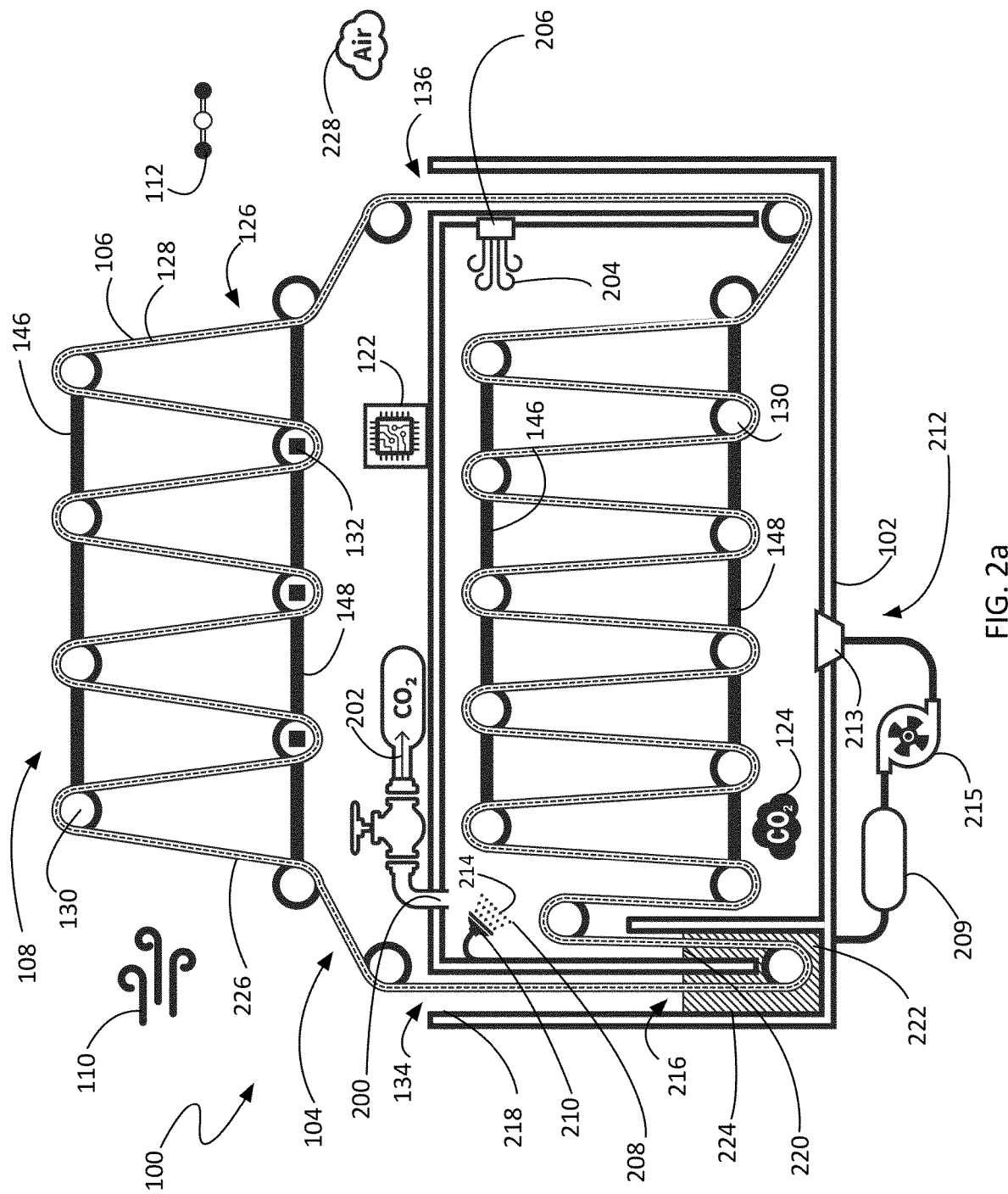
FIG. 2a is a side view of a system for passive collection of atmospheric carbon dioxide with a liquid trap.

FIG. 2a is a side view of a non-limiting example of a passive capture system 100 configured for continuous operation. It should be noted that in the context of the present description and the claims that follow, continuous operation does not mean that the system 100 must always be in operation, but rather that it is capable of capturing $CO_2$ from the atmosphere on one part of the capture body 104 while simultaneously releasing captured $CO_2$ from another part of the capture body 104 inside of the harvest chamber 102. While such a capability may allow the system to be in constant motion, it should not be interpreted as requiring it to do so. In contrast, a system 100 operating in a batch mode alternates between capturing and releasing, but is not able to do both at the same time. It should also be noted that, in FIGS. 2a-c, 3a-b, and 5a-b, a portion of the harvest chamber 102 has been removed to reveal the interior. Additionally, some elements are portrayed using a schematic or iconic representation, for the sake of clarity.

When the capture body 104, or a portion of the capture body 104, is laden with $CO_2$ and has been moved into the harvest chamber 102, the sorbent material 106 is regenerated to release the captured $CO_2$ into the harvest chamber 102. As previously discussed, this regeneration and release is accomplished by the sorbent regeneration system 140. According to various embodiments, including the non-limiting example shown in FIG. 2a, the sorbent material 106 of the capture body 104 may be a moisture swing sorbent material 226. In embodiments where the active sorbent material 106 in the belt 126 is a moisture swing sorbent 226, stimulation of $CO_2$ release in the chamber 102 can occur by wetting the material 106 with liquid water 214 or exposure to high levels of moisture or steam. In embodiments making use of a moisture swing sorbent material 226, the sorbent regeneration system 140 comprises a release medium 208, at least one release medium emitter 210, and at least one liquid extractor 212.

In the context of the present description, the release medium 208 is a material or substance that stimulates the release of $CO_2$ from the sorbent material 106. In the case of a moisture swing sorbent material 226, the release medium 208 may be liquid water 214 or steam 244. In other embodiments, the release medium may be any other solution or substance that is compatible with that particular sorbent material 106. Furthermore, in the context of the present description and the claims that follow, a release medium emitter 210 is a device configured to promote the interaction of the release medium 208 and the $CO_2$-laden sorbent material 106. Exemplary release medium emitters 210 include, but are not limited to, misters, nozzles, foggers, liquid jets, a reservoir of release medium through which the sorbent passes, steam nozzles, and the like.

In embodiments where the release medium 208 takes a liquid form, either when being applied through an emitter 210 or after application (e.g. steam 244 condensing into liquid water 214 upon cooling, etc.), the sorbent regeneration system 140 may further include one or more liquid extractors 212, which are devices and/or structures configured to collect the liquid release medium 208 and remove it from the chamber 102 after it has stimulated the $CO_2$ release, either for disposal, immediate reuse, or conditioning in preparation for reuse (e.g. removing impurities, etc.). For example, as shown in FIG. 2a, liquid water 214 may be sprayed on to the belt 126 with a release medium emitter 210, after which it drips down to the bottom of the harvest chamber 102. The liquid extractor 212 comprises a drain 213 at the bottom of the chamber 102 that is coupled to a release medium reservoir 209 through a pump 215. Collected liquid water 214 is returned to the reservoir 209 by the pump 215 for repeated use, reducing the overall water requirements for operating the system 100 and making it usable in environments with reduced water availability.

After the $CO_2$ has been released from the sorbent material 106 of the capture body 104 inside the chamber 102, it mixes to form an enriched gas 124. According to various embodiments, the enriched gas 124 is subsequently removed from the chamber 102 through a product outlet 200 as a product stream 202. In some embodiments, the product outlet 200 may be a valve, while in others it may comprise a pump. The product outlet 200 is in fluid communication with the inside of the harvest chamber 102.

In some embodiments, the product stream 202 is formed by displacing the enriched gas 124 with a sweep gas 204 introduced to the inside of the harvest chamber 102. In some embodiments, the sweep gas 204 is atmospheric air 228, while in others the sweep gas 204 is another readily available gas. In some embodiments, the sweep gas 204 is introduced to the chamber 102 by passing through an opening (e.g. first opening 134, second opening 136, etc.). In other embodiments, the sweep gas 204 may be introduced to the chamber 102 through an intake 206.

According to various embodiments, the belt 126 enters and leaves the harvest chamber 102 through a channel or channels that are designed to minimize airflow in and out of the chamber 102. Precautions are taken to minimize airflow between the inside and the outside to prevent or minimize the loss of $CO_2$ from the harvest chamber 102, but rather allowing the $CO_2$ to build-up the harvest chamber 102. In some embodiments, the flow through one or more of these channels may be manipulated or otherwise controlled such that the sweep gas 204 is introduced to the chamber 102 at a desired rate.

In some embodiments, the air flow through a channel (e.g. first opening 134, etc.) may be eliminated or held very close to zero. One example, a liquid trap 216, will be discussed below. In embodiments having a first opening 134 where the belt 126 enters and a second opening 136 where the belt exits, and where the air flow is eliminated at the first opening 134, the sweep gas 204 will enter through the second opening 136.

The atmospheric air 228 enters the chamber 102 through the second opening 136 and flows over the belt 126, initially encountering portions of the belt 126 that have mostly discharged their $CO_2$ and eventually arriving at the end of the chamber 102 where the belt 126 is still fully loaded with $CO_2$. Advantageously, the product outlet may be placed near the first opening 134, where the sweep gas 204 is driving the enriched gas 124, and opposite the second opening 136. The $CO_2$ laden air (i.e. enriched gas 124) is then removed from the chamber 102 for use or further processing.

On the side where the belt 126 enters, airflow through the channel may be minimized or eliminated, while on the side where the belt 126 leaves airflow may enter through the second opening 136 and add to the sweep gas stream 204 for collecting the $CO_2$. If the airflow through the second opening 136 is throttled below the required flow rate, a separate air intake 206 near the exit of the belt (i.e. second opening 136) may be used for maintaining the appropriate amount of sweep gas 204, thereby increasing the control over the flow rate of the product stream 202.

In some embodiments, the belt 126 may be fed into the chamber 102 through a liquid trap 216. A liquid trap 216 is a channel that is partially filled with water 222 or some other liquid. It comprises an external aperture 218 exposed to the atmosphere and an internal aperture 220 that is below the external aperture 218 and submerged under water 222 such that the water 222 separates the inside of the harvest chamber 102 from the external aperture 218. The internal and external apertures are connected by a conduit 224 that is at least partially filled with water 222. In some embodiments, the conduit 224 is U-shaped. In this manner, $CO_2$ is prevented from flowing in and out of the chamber 102. In the case of a moisture swing sorbent 226, the liquid trap 216 may also provides a means of wetting the sorbent 106. Another method of controlling flow into or out of the chamber 102 is making use of dynamic air locks 230, and will be discussed in greater detail with respect to FIG. 2b.

In a particular embodiment, the harvest chamber 102 may contain a fixed set of rollers 130 attached at the top of the harvest chamber 102, and a lower rack of rollers 148 able to move up and down. The chamber 102 may be rectangular in shape and may have dimensions that make it match the size of a standard shipping container. The front end of the shipping container-sized harvest chamber 102 may contain the liquid trap 216 for letting the belt 126 in without losing $CO_2$. The belt 126 may comprise a moisture swing sorbent 226 that is wetted as it goes through the water filled liquid trap 216. The belt 126 moves out of the chamber 102 through a second opening 136 at the back end, which also lets air in at a proscribed rate that matches the rate of the product stream 202. For maintenance, the roof may be comprised of panels that can be removed and give access to the motorized rollers 130 at the top. Some or all of the top rollers 130 are motorized. The speed of the motorized rollers can be independently controlled by the control system 122. As an option, the side panels may be opened to give access to the sides for maintenance and repair.

The release of $CO_2$ in the harvest chamber 102 is often slow. For most air capture sorbents 106, the evolution of $CO_2$ is relatively slow and the high partial pressure evolves over a significant amount of time, which can range from a few minutes to a few hours. A major challenge is to move the sorbent material 106 into and out of the chamber 102 without losing significant amounts of the collected $CO_2$ to the outside ambient air. The higher partial pressure evolves over a long time and thus it is important that the harvest chamber 102 does not readily exchange gas with the outside during the regeneration of the sorbent material 106.

This can be accomplished in a batch mode by opening and closing the harvest chamber 102 (see FIGS. 5a and 5b), but in a continuous process it may need an air lock design that makes it possible to insert $CO_2$-laden sorbent material 106 into the chamber 102 in a continuous manner and remove it at the same time, while minimizing the exchange of gas with the outside.

One approach, mentioned above, is to create a liquid trap 216. The liquid level in the trap 216 may be high enough that it can adjust to the expected pressure fluctuations between the inside and the outside of the chamber 102, and the movement of the belt 126 may be slow enough that most of the water 222 or other liquid will flow back to the bottom of the trap 216 as the belt 126 moves in or out of the chamber 102. Similar designs could be considered for other forms of sorbent material.

The use of a liquid trap 216 to inhibit air flow through a channel is advantageous for a number of reasons. It is more responsive to pressure changes (e.g. gusts of wind, etc.) than deliberate mechanisms such as the dynamic air lock, which relay on sensors and programmatic responses. Additionally, the liquid trap 216 does not require any energy to operate, and the only resource expended is liquid lost to evaporation or carried off by the belt 126. In some embodiments, the liquid trap 216 may also serve as the sorbent regeneration system 140.

However, the use of a liquid trap 216 has some pitfalls as well. The amount of wetting applied by the liquid trap 216 might be counterproductive for some designs. For example, the wetting can add weight to the sorbent 106, and as the belt 126 leaves the chamber 102, the water 222 that has been soaked up by the belt 126 will have to evaporate into the outside air. This will create a water loss for the system 100, and may also temporarily stop the belt 126 from being active. For example, in some embodiments, the belt 126 may be made from a moisture swing sorbent 226. The excess water 222 associated with belt 126 when it leaves the chamber 102 will prevent the belt 126 from binding additional $CO_2$ until the belt 126 has dried.

As discussed above, it is advantageous to control the flow of air through any openings in the harvest chamber 102 (e.g. first opening 134, second opening 136, etc.), to prevent loss of $CO_2$ that has been released from the sorbent material 106. According to various embodiments, the flow of air may be controlled, or substantially eliminated, through the use of a dynamic air lock 230 that makes use of flows or counter flows generated by one or more flow generators 234. In the context of the present description and the claims that follow, a dynamic air lock 230 is an air lock that may be configured and reconfigured to modify how much flow is permitted to pass through an open channel 232 of a chamber 102, if any at all, and in what direction.

In the context of the present description and the claims that follow, a flow generator 234 is a device that can create an air flow, and that can fit inside an open channel 232 (e.g. a conduit or opening bridging the interior of the harvest chamber 102 with the ambient air). Examples include, but are not limited to, fans, blowers 240, nozzles supplied with compressed gas (e.g. compressed atmospheric air if injected close to an external aperture of the channel, compressed enriched gas 124 if close to the interior of the chamber 102, etc.), and the like.

Figure 2B:
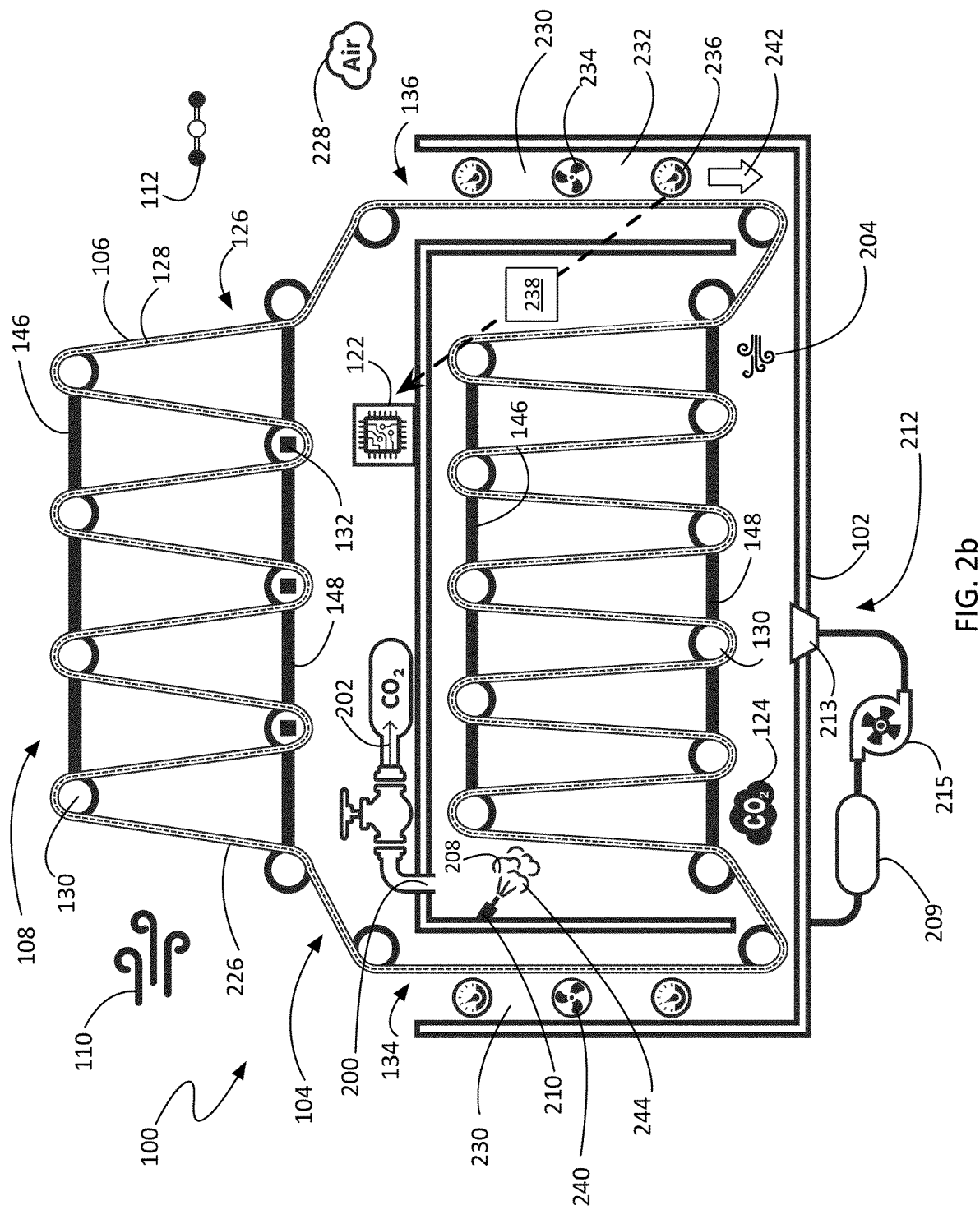
FIG. 2b is a side view of a system for passive collection of atmospheric carbon dioxide with a dynamic air lock.

FIG. 2b is a side view of a non-limiting example of a passive collection system 100 making use of two dynamic air locks 230, in conjunction with a moisture swing sorbent 226 and a steam release medium 244. As shown, the vertical channels to the right and left are open to the outside. Unless the chamber 102 is sealed, or otherwise prevented from having air exchange between the inside and the outside, pressure fluctuations either on the inside or the outside will cause air to be mixing between the two reservoirs (the enriched gas 124 in the chamber 102, and the ambient air 228 in the atmosphere).

It should be noted that the following discussion is done in the context of a chamber 102 wherein the open channel 232 in one dimension may reflect the full width of the interior of the chamber 102 whereas the other dimension may be far smaller. The embodiments described below could also apply to a square or circular horizontal cross-section of the channel 232.

The gas flow in and out of the chamber 102 is desired to be zero, or to be held constant at a prescribed value that optimizes the $CO_2$ delivery based on a user objective. As shown, both the first opening 134 and the second opening 136 comprise dynamic air locks 230. In some embodiments, the harvest chamber 102 may have more than these two openings/channels. Furthermore, in some embodiments, it is also possible to use a liquid trap to control one of these two channels, as discussed above with respect to FIG. 2a.

According to various embodiments, the flow between the inside and the outside may be minimized, or to set to a desired level, through the use of devices, in both channels, that can cause air to move forward or backward in the channel. In one embodiment, these flow generators 234 (also referred to as pressure drop generators) may be a set of small fans through which the air would have to flow. In some embodiments, the fans may not cover the entire cross section of the open channel 232, but are installed in a sub cross-section which creates an overall airflow. This would make it possible to feed objects, like a belt 126, through the opening 134. In yet another embodiment, air may be pushed out along the edge of the wall in a thin layer that moves along the wall creating a boundary condition that drags air inside the channel 232 along in the desired direction. In yet another embodiment, small nozzles may be employed to push air out into the channel 232, either upward or downward. In all of these embodiments, the goal is to adjust these flows such that the net flow through the channel 232 is as close to zero, or to the desired level (e.g. desired rate of sweep gas, rate sufficient to maintain a constant $CO_2$ level in the chamber 102, etc.), as can be accomplished. Unless explicitly stated otherwise, in the following discussion no assumptions are made about the particular type of flow generator 234.

According to various embodiments, for such a system 100 to become approximately sealed, the channel 234 needs to be long enough and narrow enough that the air mixing creates a uniform flow throughout the width of the channel 234. The velocity profile need not be flat. Unless the flow is extremely turbulent there will be a velocity profile across the channel even if the flow is allowed to stabilize.

In one embodiment, a simple control loop implemented by the control system 122 for zero flow considers the length of the channel 234 either upstream or downstream from the flow generator 234 and adjusts the power of the flow generator 234 so as to zero out the pressure drop in the section of the channel that entirely resides on one side of the flow generator 234. A zero pressure drop over a long section of the channel 234 is accomplished when the net flow through that section is zero. If there is a desire to maintain a fixed flow rate, then the relationship between pressure drop and flow rate may be calibrated to determine the pressure drop. Alternatively, one embodiment replaces measurements of pressure differentials with measurements of flow speeds to develop control algorithms. In other embodiments, mass flows may be determined directly and used to regulate the flow generators 234.

In embodiments where the flow generators 234 installed in the first 134 and second 136 openings are close to the bottom of the channel, the pressure drop in the subsequent vertical part may be controlled. If the flow generator 234 is near the top, a similar section in the stream may be used, but this time it is part of the inside stream. If the flow generator 234 is close to the middle of the section, either side, or both sides may be considered in the control algorithm.

In other embodiments, the flow generator 234 may be used to cause a pressure drop between its two sides near the generator 234 that is equal to the overall pressure drop between the inside and outside of the chamber 102. In that case, there would be zero pressure drop in the inside part of the channel 234 and zero pressure drop in the outside part of the channel 234, which would suggest that the net flow through the channel 234 approaches zero. In a particular embodiment, there may be multiple measurements that provide redundancy and higher accuracy, including but not limited to pressure differentials between the inside and the outside of the chamber 102, a pressure differential across the flow generator 234 near the generator, and two pressure differentials of a pair of points, each pair completely on one side of the flow generator 234. In addition, there may be at least one absolute pressure measurement. A control algorithm used by the control system 122 may take all data into account, or a subset of the data.

According to various embodiments, the operation of one or more flow generators 234 communicatively coupled to the control system 122 may depend upon a sensor reading 238 obtained by the control system 122 from a sensor 236 located in or near the open channel 234. Exemplary sensors 236 include, but are not limited to, pressure sensors, flow speed sensors, mass flow sensors, thermal anemometers, and ultrasound anemometers.

In embodiments where a closed-loop belt 126 is wending its way into and out of the harvest chamber 102, gas entrained in the belt structure may be carried with the belt 126 and thus create a mass transfer. This may be compensated for by having an equivalent stream go the opposite direction, employing active blowers 240 exchanging air between the open channel 234 and the belt 126 to minimize carry through. Furthermore, a belt 126 effectively splits the channel 234 into two separate channels. According to various embodiments, a zero pressure drop may be maintained independently on both sides of the belt 126 within the channel 234.

The pressure differential between the inside and the outside may vary substantially on longer time scales. For example, temperature changes inside a closed chamber 102 on the order of 30K, could result in pressure changes on the order of 10% of an atmosphere (or 10 kPa). Power requirements on the flow generators 234 may become excessive, if they would have to maintain a pressure difference on that order for substantial amounts of time. On the other hand, in embodiments that allow for a slow gas flow through the chamber 102, it would be possible to gradually adjust the pressure differential without getting outside of the design specifications for the gas flow, simply by configuring for different inflow and outflow rates.

As a specific example, it the sun were to heat up the chamber 102, the system 100 could gradually adjust its pressure over a time period that is comparable to the time it takes the belt 126 to move through the chamber 102. The blowers would still have to handle short time pressure fluctuations driven, for example by wind gusts. There may be a maximum pressure drop the system 100 can generate, and when wind speeds exceed this limit, the performance of the system 100 will be degraded. On the other hand, typical wind gusts will lead to much lower pressure fluctuations than diurnal temperature changes. Wind fluctuations are typically in the tens of Pa, but they can reach values on the order of one kPa.

As a specific example, a system 100 comprises a harvest chamber 102 that is 100 m³ in volume, with dimensions of 2.5 m×4 m×10 m. On the end section are two slits, each 0.1 m×2.5 m, that connect the inside to the outside. The wind outside is blowing at some speed, and fluctuations in the wind can cause a change in the pressure differential between the inside and the outside of the chamber 102. There are two types of flows; one is caused by a constant pressure differential between the two openings on the opposite sides of the harvest chamber 102. The other is due to variations in the total pressure on the outside of the chamber 102 caused by the Bernoulli effect. The flow speed through the entrance could be as high as 70% of the wind speed, but since the width of the slit is only 1 part in 25 of the height of the chamber 102, the actual flow speed of air across the inside of the chamber 102 could be as much as 3% of the flow speed on the outside. If the wind speed is 5 m/s, the time to cross the length of the chamber 102 on the outside is about 2 seconds, while on the inside it would be about 1 minute. If the path through the chamber 102 is long and narrow, this time can get substantially longer, in part because the distance to travel gets longer, and in part because the flow inside the chamber 102 will contribute its own pressure drop, which will take away from the pressure drops at the ends. This might extend a minute to a good fraction of an hour.

Huffing and puffing during wind gusts works differently. A wind gust lowers the pressure on the outside, on both ends, simultaneously. Assuming wind gusts up to 10 m/s, then the pressure drops on the outside because of Bernoulli's law by about 60 Pa on one of the two openings. The same effect might be happening on the other side as well. A single opening would induce a flow rate of up to ten meters second, which could result in an exchange between inside and outside air at a rate of 1 cubic meter per second. If the wind moves back and forth every few seconds that could lead again to an air exchange in the chamber that could turn over the air once a minute. Some embodiments address this using a long serpentine path.

To obtain an exchange time on the order of an hour or more, the control system 122 needs to effectively lower the uncontrolled flow rates through the openings by one to two orders of magnitude, according to various embodiments. Assuming that the flow through the harvest chamber 102 is quadratic in the pressure drop, this means that the control system 122 needs to reduce the effective pressure drop in the channel 232 by an order of magnitude.

In a specific embodiment, the system 100 feeding a belt 126 through the gap comprises a set of flow generators 234 close to the wall of the channel 232, which can push out gas in small bursts or steady flows that are controlled by a valve that can adjust total flows. Air from the inside of the chamber 102 can be used to maintain a fixed pressure drop at the end. On the second opening 136 for the belt 126, the airflow is calibrated into the chamber 120. Alternatively, zero flow through the belt exit 136 could be attained. It is advantageous to control the flow through the belt channel to zero on this end, since the air extracted from the chamber 102 is the product stream 202, making it difficult to collect from the channel 232 after the exit.

According to various embodiments, the product flow 202 may be removed near the first opening 134. For example, in one embodiment, the product flow 202 could be pulled out with a small scroll pump. In one embodiment, the entry and the exit of the belt are on the same side of the chamber 102. This minimizes the pressure differential between the entry and the exit. It furthermore makes it possible to have a small inward leak on both belts 126 and have the air exit for the chamber on the opposite side of the flow. The belt 126 coming into the chamber 102 could therefore still be dry.

Figure 2C:
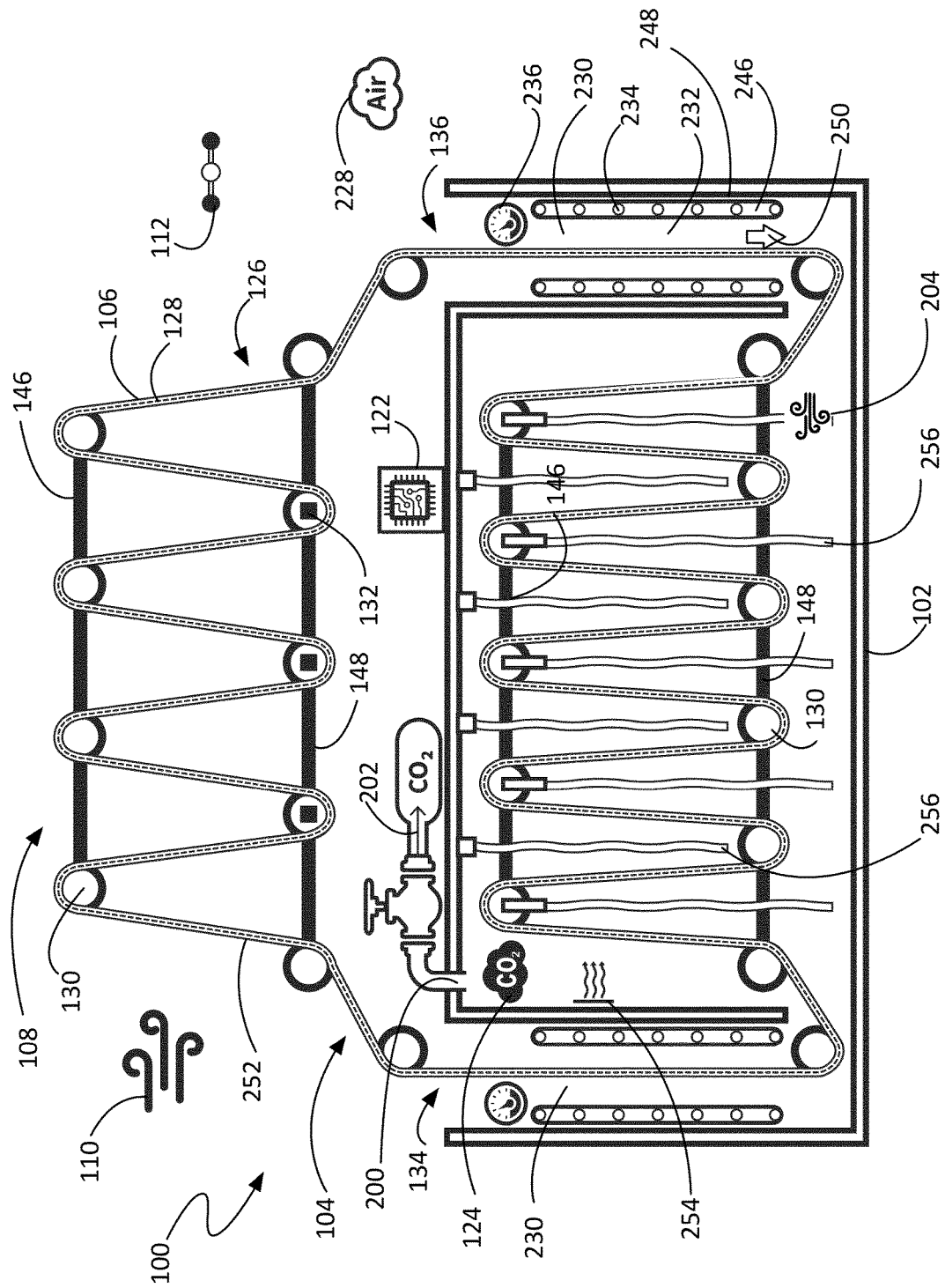
FIG. 2c is a side view of a system for passive collection of atmospheric carbon dioxide with a dynamic air lock using drag belts.

FIG. 2c is a side view of a non-limiting example of a passive collection system 100 making use of a heat swing sorbent material 252. In embodiments where the sorbent material 106 is a thermal or heat swing sorbent 252, stimulation of the $CO_2$ in the chamber 102 can occur by heating the sorbent material 106 inside the chamber 102. In other words, the sorbent regeneration system 140 for a heat swing sorbent 252 comprises one or more heat sources. In some embodiments, heating of the sorbent material 252 in the chamber 102 may be achieved using mild steam 244 that condenses on the sorbent material 106. Heating of the sorbent material in the chamber may be achieved using mild steam that condenses on the sorbent material. This method of regeneration can work with thermal swing materials and moisture swing materials. It provides the advantage of amplifying the moisture swing with a thermal boost, and it eliminates the release of water vapor from the sorbent material into the harvest chamber, which otherwise would consume significant amounts of energy.

Other examples of means of heating the heat swing sorbent 252 include, but are not limited to, direct heating of the surrounding air in the harvest chamber 120, radiative heating of the belt 126 (e.g. with visible light, infrared light, microwaves, etc.), and guiding the belt 126 over heated rollers 130. Adding UV lights to the sorbent regeneration system 140 could also be advantageously used to discourage microbial growth on the belt 126.

Additional heat sources 254 may include, but are not limited to, geothermal heat, waste geothermal heat left over after geothermal heat of higher temperature has been applied in some other application, residual heat from power plants and other energy consumers, solar heat, and heat collected from cooling solar panels. In some embodiments, the waste heat generated by a $CO_2$ compression system used on the product stream 202 may be repurposed for heating the harvest chamber 102.

As shown, in some embodiments, a flow generator 234 may comprise one or more drag belts 246, which are flat belts that move along the flat surfaces of a channel wall 248 and create a boundary condition where air on the surface moves with the speed of the drag belt 246. Thus, in some embodiments, a dynamic air lock 230 may be formed using drag belts 246 to create a flow 250 in the channel in the direction that the drag belt 246 is moving that results in a desirable average flow 242 across the channel 232.

In some embodiments, lightweight flexible materials may be attached to the interior of the harvest chamber 102 and the racks that minimize gas exchange between the active belt-filled part of the harvest chamber 102 and the idle part of the chamber 102 that is above the top rollers or below the bottom rollers. In one embodiment, the vertical connections or curtains 256 may be a rolled up "jalousie" like material that extends from the top rack down to right above a bottom roller, and conversely a similar design for material extending from the bottom rack right below the opposing top roller. These curtains 256, which may loosely touch the walls of the harvest chamber 102, may extend and shrink as the distance between the racks changes and create a serpentine pathway for air to flow along the belt 126.

Figure 3A:
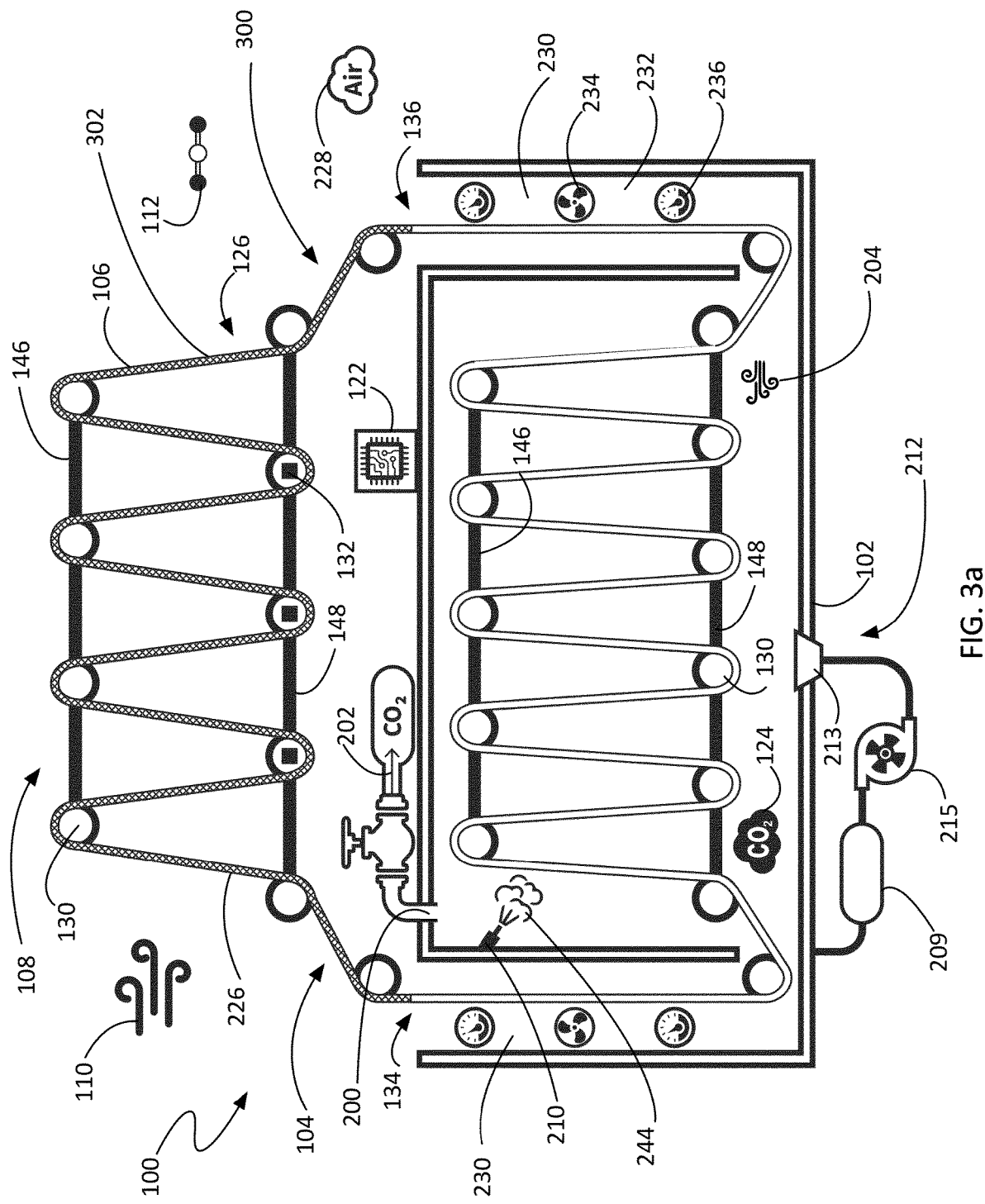
FIGS. 3a and 3b are side views of the system of FIG. 2b with the capture body in a collection configuration and a release configuration, respectively.
Figure 3B:
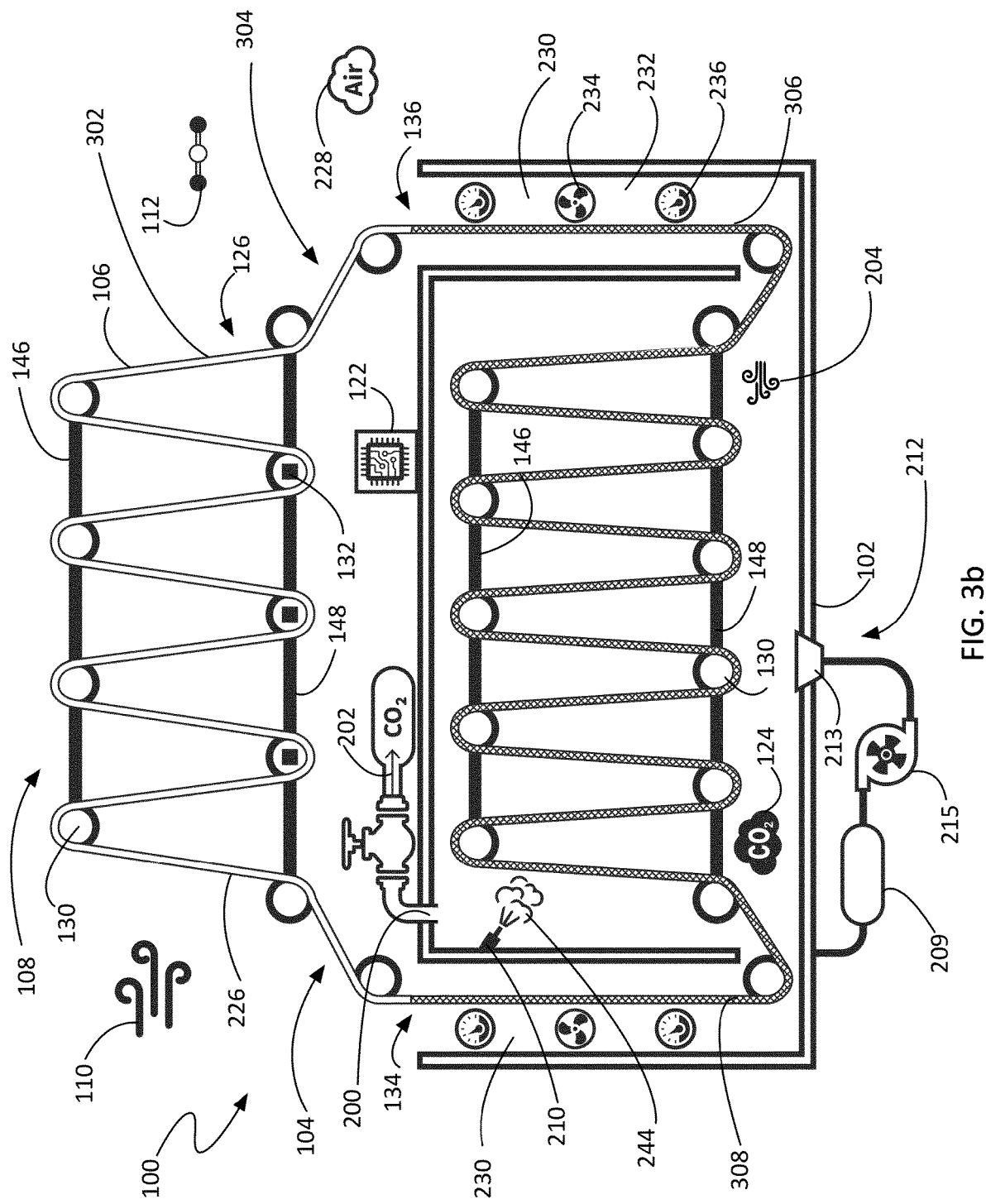

FIGS. 3a and 3b show side views of the non-limiting example of a system 100 shown in FIG. 2b. Specifically, FIG. 3a shows the capture body 104 of the system 100 in a collection configuration 300, and FIG. 3b shows the capture body 104 in a release configuration 304. It should be noted that the closed-loop belt 126 is shown with roughly half of the belt 126 shaded. This is done to make the two configurations distinct, since in a system 100 configured for continuous operation, the capture body 104 may be in both configurations simultaneously. The shading allows the capture/release cycle to be easier to observe across FIGS. 3a and 3b, and should not be interpreted as limiting or indicating a property of the belt.

In the context of the present description and the claims that follow, a collection configuration 300 is an arrangement of the capture body 104 wherein at least a portion 302 of the capture bod 104 able to capture carbon dioxide is in contact with an airflow outside the harvest chamber 102, such that atmospheric carbon dioxide is captured by the sorbent material 106. Furthermore, in the context of the present description and the claims that follow, a release configuration 304 is an arrangement of the capture body 104 wherein at least a portion 306 of the capture body 104 holding captured carbon dioxide 308 is in contact with the sorbent regeneration system 140 inside the harvest chamber 102 such that captured carbon dioxide 308 is released into the harvest chamber 102 to form an enriched gas 124.

According to various embodiments, a method for passively collecting atmospheric carbon dioxide includes exposing at least a portion 302 of the capture body 104 able to capture carbon dioxide to a natural airflow, and then moving the at least a portion 302 of the capture body 104 holding captured carbon dioxide 308 into the harvest chamber 102 using the support structure 108 coupled to the capture body 104 and driven by a control system 122 communicatively coupled to the support structure 108. The portion 306 of the capture body 104 holding captured carbon dioxide 308 enters the harvest chamber 102 through a first opening 134. The method then includes regenerating the sorbent material 106 of the capture body 104 and releasing the captured carbon dioxide 308 into the harvest chamber 102 to form an enriched gas 124 by exposing the sorbent material 106 to a release medium 208 introduced to the harvest chamber 102 by a release medium emitter 210. Additionally, the method includes extracting the release medium 208 in liquid form from the harvest chamber 102 using a liquid extractor 212. Afterward, or simultaneously, the product stream 202 of enriched gas 124 is removed from the harvest chamber 102 through a product outlet 200 by displacing the enriched gas 124 with a sweep gas 204. Finally, the at least a portion of the capture body 104, now having regenerated sorbent material 106, is removed from the harvest chamber 102 by driving the support structure 108 with the control system 122.

According to various embodiments, the control system 122 may comprise communication equipment for remote monitoring and operation. In some embodiments, the control system 122 may be configured for autonomous operation, adapting to ambient conditions as needed. Power may be supplied directly, via battery, or from a renewable source such as, for example, solar, wind, or thermoelectric.

In some embodiments, the control system 122 may be communicatively coupled to one or more sensors (e.g. $CO_2$ sensors, humidity sensors, temperature sensors, air flow sensors, light sensors, etc.) and may be configured with algorithms for efficient operation of the system 100.

In some embodiments, the control system 122 may employ algorithms developed to produce the best response from the sorbent 106. These algorithms may be designed to combine heating and moisture applications in a most efficient manner. In some embodiments, the algorithms optimize the balance between performance and operational cost, so that water and heat are deployed to optimize $CO_2$ delivery at optimal rate and optimal partial pressure. Optimization may also account for ambient temperatures, the loading state of the sorbent 106, weather conditions, the cost of heat, water, and electricity, and other relevant parameters.

The control system 122 may make use of software configured to control one or more operations or properties, including but not limited to the rate of addition of water in the form of liquid/fog/steam, internal temperature, flow rate of sweep gas, pumping rate to pull product gas out, timing of exposure to air, time within harvest chamber 102, and the like. The software may be configured to optimize various properties, such as yield, water consumption, and/or energy consumption.

Automated system may include, but are not limited to, wind/weather measurement and response, $CO_2$ collection monitoring, automatically timed movement of the capture body 104 and/or support structure 108, water and air control systems, temperature measurement & control, internal flow measurement, timing controls to match the function of other system, and the like.

Figure 4:
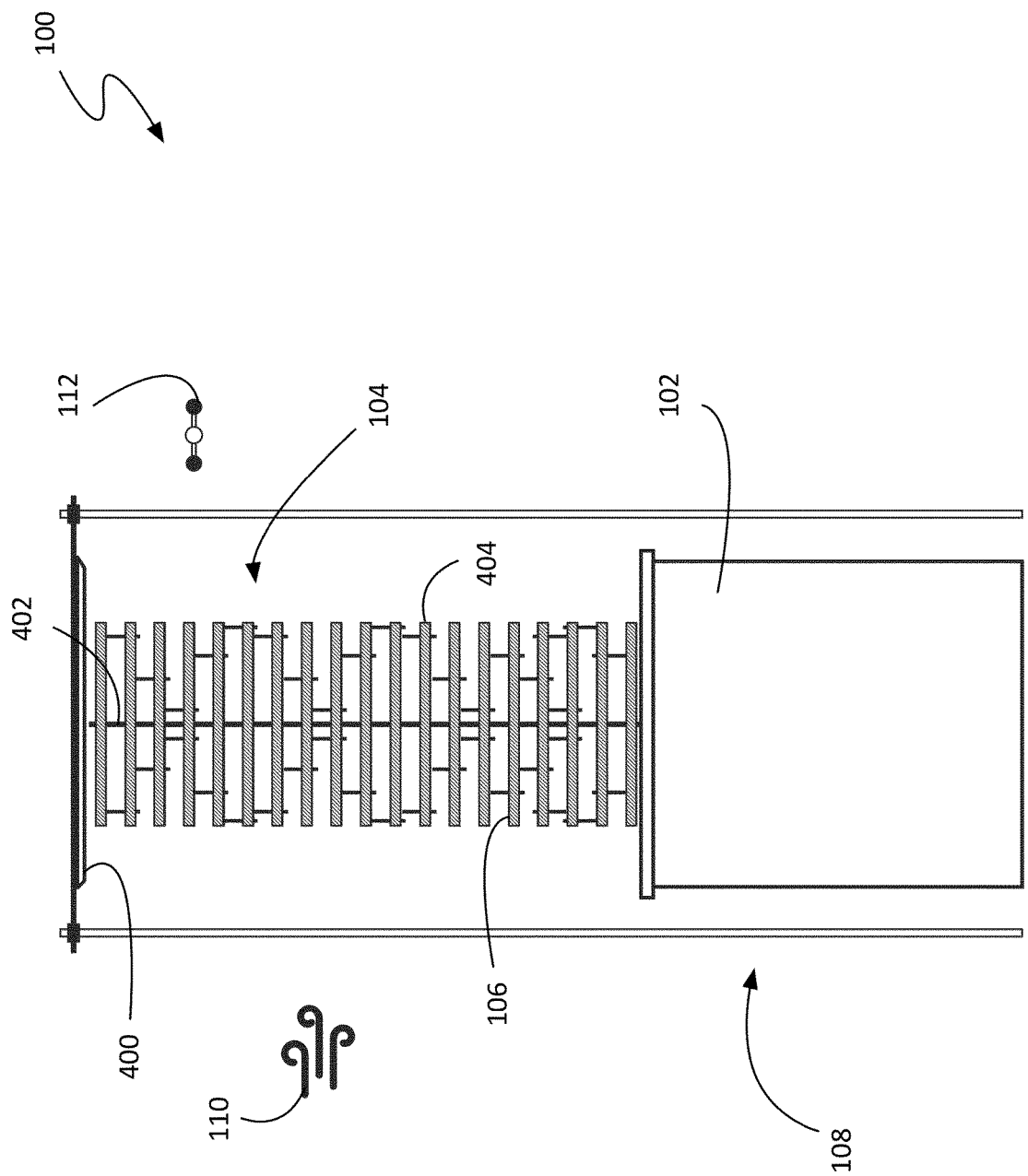
FIG. 4 is a side view of a system for passive collection of atmospheric carbon dioxide.
Figure 5A:
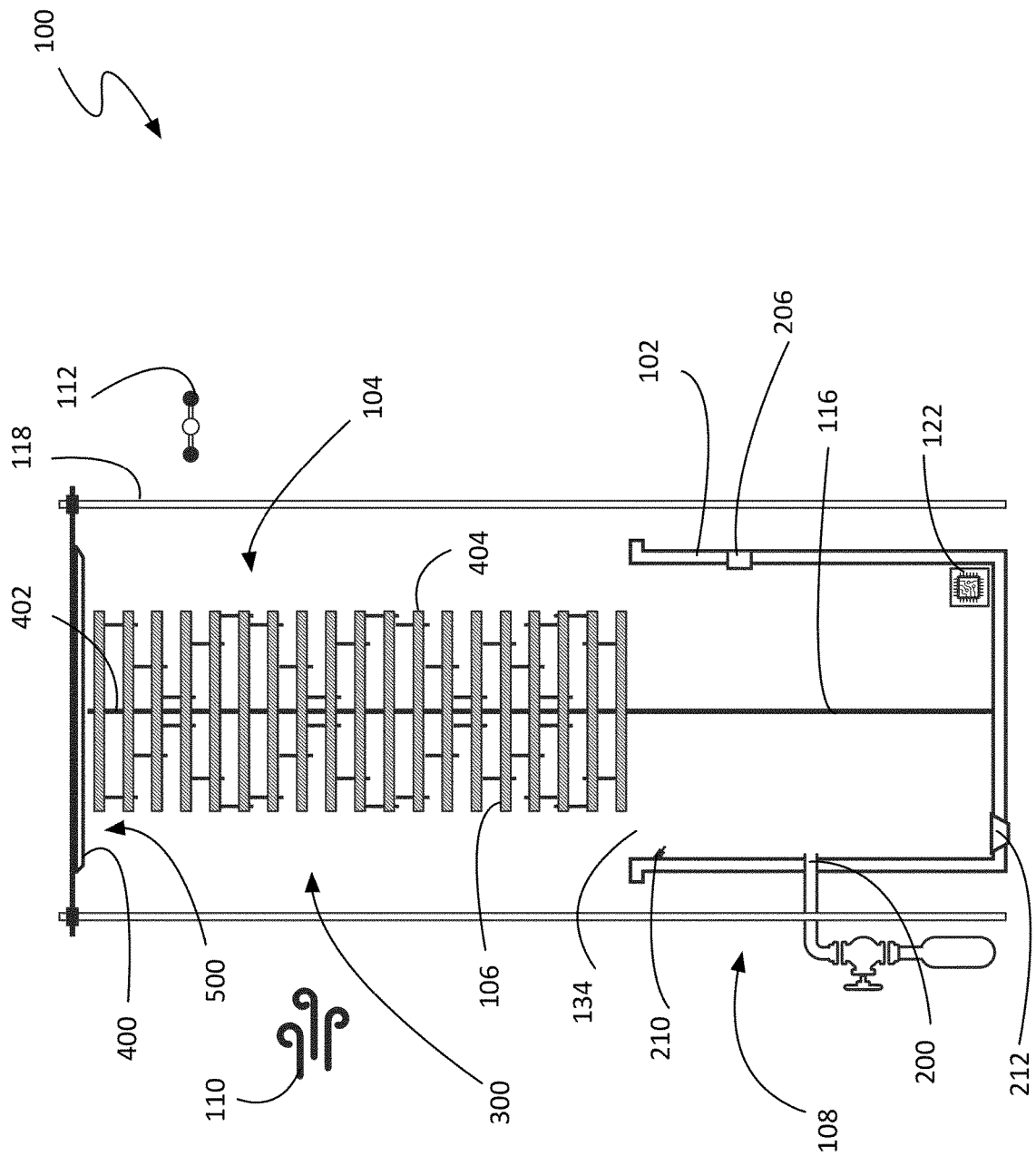
FIGS. 5a and 5b are side views of the system of FIG. 4 with the capture body in a collection configuration and a release configuration, respectively.
Figure 5B:
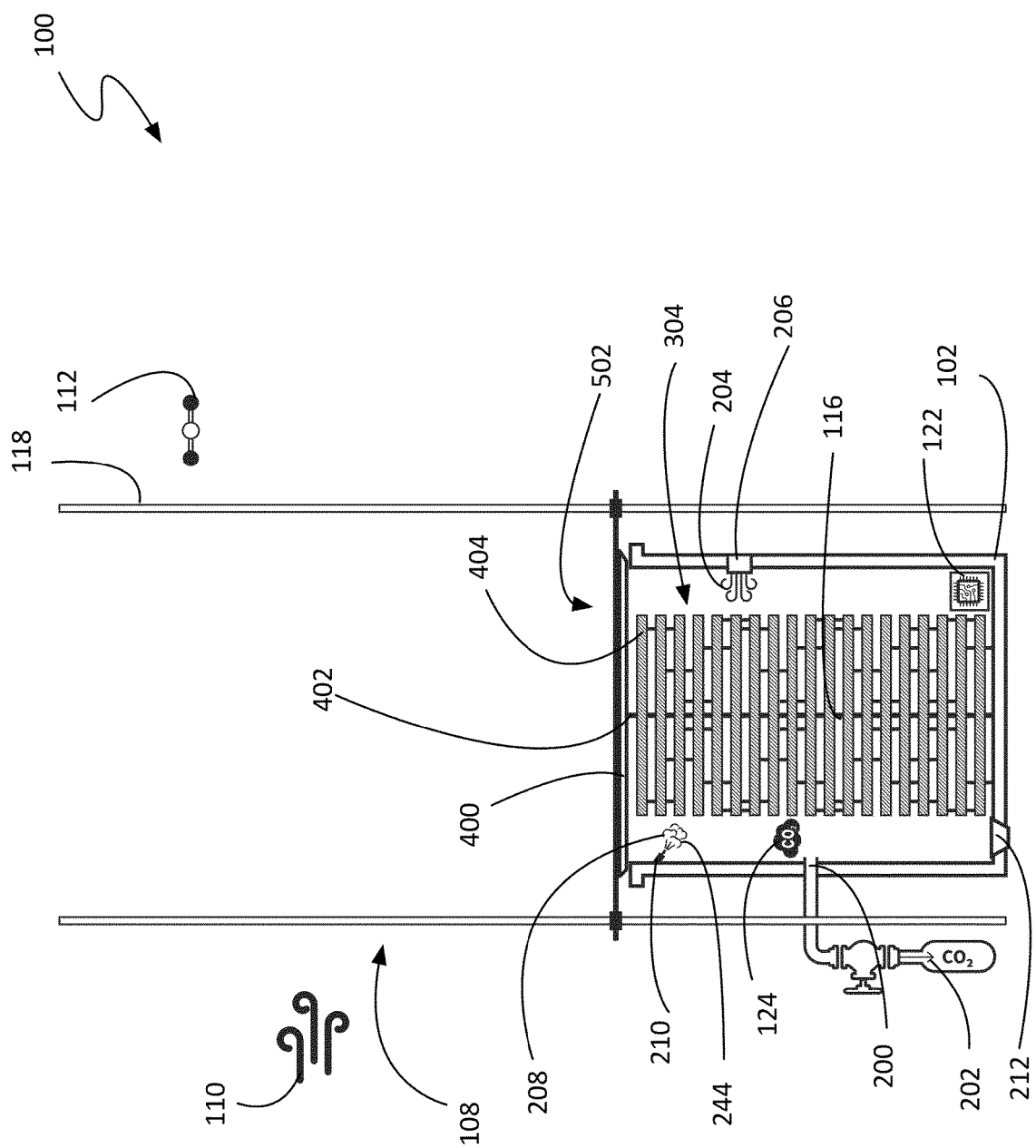

The systems 100 configured for continuous operation discussed above are advantageous in terms of energy cost and adaptability over batch processing methods. However, such systems may be difficult to optimize for harvesting airflows from multiple directions (e.g. efficiency may be poor for certain vectors). FIGS. 4, 5a, and 5b show a side view of a non-limiting example of a passive collection system 100 configured for batch operation. Specifically, FIG. 4 is a side view, FIG. 5a is a side view of the system 100 of FIG. 4 with part of the harvest chamber 102 removed for clarity and with the lid 400 in an open position 500, placing the capture body 104 in a collection configuration 300. FIG. 5b is the same as FIG. 5a, except the lid 400 is in a closed position 502, placing the capture body 104 in a release configuration 304.

As shown, the system 100 makes use of a capture body 104 that is made up of a set of plates 404 that are exposed to air while the plates 404 hang from a lid 400 by a collapsible tether 402, while the lid 400 is in an open position 500. The plates 404 hang essentially horizontal and parallel to each other in an essentially vertical stack. The circular shape allows for harvesting wind from any direction. According to various embodiments, a plate 404 stack could range from a few (5 to 10) plates 404, to a large number (>1000).

The plates 404 are exposed to the open air that flows through the gaps between the plates 404 to absorb $CO_2$, while the capture body 104 is in a collection configuration 300 and the lid 400 is in an open position 500. The lid 400 is in an open position 500 when it is above and separated from the harvest chamber 102, according to various embodiments.

Once the sorbent material 106 is laden with captured atmospheric $CO_2$, the support structure 108 lowers the capture body 104 into the harvest chamber 102 over which it hangs. Once the lid 400 is a closed position 502, the sorbent regeneration system 140 is employed to release the capture $CO_2$, as described for various embodiments above. The lid 400 is in a closed position 502 when it is covering the first opening 134 of the harvest chamber 102, completely enclosing the capture body 104 inside the harvest chamber 102. The system 100 then cycles between collection and release, raising and lowering the capture body 104 through the first opening 134 of the harvest chamber 102.

During the time in the open air, the plates 404 may be supported by one or more collapsible tethers 402, which may be chains or other flexible supports that are mounted to the lid 400 or other part of the support structure 108 designed to raise and lower the plates 404 from the harvest chamber 102. The tether 402 and the plates 404 may be raised and lowered automatically or on demand. The sorbent material 106 on the plates 404 loads up in the open air, and releases $CO_2$ inside the harvest chamber 102.

In some embodiments, within the harvest chamber 102 a mechanically driven air stream flows through the chamber 102. The chamber 102 may be sealed by the lid 400 and/or other structures, except for channels associated with the sorbent regeneration system 140 (i.e. release medium emitter 210, liquid extractor 212, etc.), an intake 206 for sweep gas 204 to enter, and/or a product outlet 200 for $CO_2$ laden enriched gas 124 to leave the chamber 102.

While the term plates 404 is derived from one possible design where plates 404 are flat circular shapes, it is important to note that in the context of the present disclosure, the term plate 404 is intended to accommodate a much broader range of geometries.

In some embodiments, the plates 404 may have a circular cross-section (along the central axis of the stack). In other embodiments, other shapes may be employed, including but not limited to, circular approximations (e.g. higher order polygons), triangles, rectangles, squares, hexagons, stars, rings, and the like. While the circular cross-section may be appropriate for use in environments with unpredictable wind direction, in other embodiments, a more oblong disk may be employed in conditions where the wind has a prevailing direction.

In other embodiments, the plates 404 may be non-planar, such as bowl or helmet shaped. In some embodiments, the plates 404 may be highly structured to facilitate gas contact with their surface. The plates 404 may comprise channels or passageways that create gas flow paths from the top to the bottom of a plates 404 to facilitate gas flow that comes in close contact with the sorbent material 106 of the plates 404.

In some embodiments, the plates 404 may hang vertically, may comprise a plurality of channels that allow natural airflow to pass through, and may be coupled to each other by hinges. When in the release configuration 304, this hinged capture body 104 is folded like fan-fold paper into a stack. As an option, this embodiment may not employ a collapsible tether 402, but instead the plurality of plates 404 may be directly attached to the lid 400, and may also be directly attached to the inside of the harvest chamber 102.

It may be advantageous to limit the motion of the plates 404 when hanging (e.g. prevent damage, optimize sorbent exposure, etc.). One way of limiting the motion is to contain the hanging plates 404 between guides as they are lifted up. One example would be a set of vertical poles, which may also give structural support to the lifting structure (e.g. the support structure 108). Three such poles would already be sufficient to constrain the sideways motion of the plates 404. Another embodiment may have the plates 404 connected through guides along a center hole, that prevents relative motions of the plates 404. If the plates 404 and the lid 400 are ring shaped, then guides could also run on the inside of the plates 404. Another option for limiting movement of the plates 404 is to tether the bottom plate to the bottom of the harvest chamber 102.

Where the above examples, embodiments and implementations reference examples, it should be understood by those of ordinary skill in the art that other passive collection systems and methods and examples could be intermixed or substituted with those provided. In places where the description above refers to particular embodiments of passive collection systems and methods, it should be readily apparent that a number of modifications may be made without departing from the spirit thereof and that these embodiments and implementations may be applied to other carbon dioxide collection systems and methods as well. Accordingly, the disclosed subject matter is intended to embrace all such alterations, modifications and variations that fall within the spirit and scope of the disclosure and the knowledge of one of ordinary skill in the art.

What is claimed is:

1. A system for passive collection of atmospheric carbon dioxide, comprising:
   a harvest chamber comprising a first opening and a sorbent regeneration system;
   a capture body coupled to the harvest chamber and comprising a sorbent material hanging from at least one collapsible tether, the capture body movable between a collection configuration wherein at least a portion of the capture body is outside the harvest chamber and in contact with an airflow such that atmospheric carbon dioxide is captured by the sorbent material, and a release configuration wherein the capture body is operated upon by the sorbent regeneration system inside the harvest chamber such that captured carbon dioxide is released into the harvest chamber to form an enriched gas; and
   a product outlet in fluid communication with the inside of the harvest chamber and configured to receive a product stream of enriched gas.

2. The system of claim 1, wherein the sorbent material is a moisture swing sorbent material, and the sorbent regeneration system comprises a release medium and a release medium emitter, wherein the release medium is one of liquid water and steam.

3. The system of claim 1, wherein the sorbent material is a heat swing sorbent material and the sorbent regeneration system comprises a heat source.

4. The system of claim 1, wherein the product outlet is configured to receive the product stream of enriched gas as it is displaced by a sweep gas introduced to the harvest chamber.

5. The system of claim 1, further comprising a control system communicatively coupled to a support structure coupled to the capture structure, the support structure configured to move the capture structure from the collection configuration to the release configuration, and the control system configured to cycle the capture body between the collection configuration and the release configuration.

6. The system of claim 5, further comprising:
   an external sensor outside the harvest chamber and communicatively coupled to the control system;
   wherein the control system is configured to respond to an ambient condition detected by the external sensor.

7. The system of claim 1, further comprising:
   a lid movable between an open position separated from the harvest chamber, and a closed position covering the first opening of the harvest chamber;
   wherein the release configuration comprises the lid being in the closed position such that the capture body is completely enclosed inside the harvest chamber.

8. The system of claim 7, wherein the capture body is coupled to the lid such that the capture body hangs from the lid when the capture body is in the collection configuration and the capture body is enclosed within the harvest chamber when the capture body is in the release configuration.

9. The system of claim 8, wherein the capture body is coupled to the lid through the at least one collapsible tether, and wherein the collapsible tether is collapsed within and contained inside the harvest chamber when the capture structure is in the release configuration.

10. The system of claim 5, wherein the support structure is integral with the harvest chamber.

11. A method for passively collecting atmospheric carbon dioxide, comprising:
- exposing a capture body to an airflow by moving the capture body into a collection configuration wherein at least a portion of the capture body is outside a harvest chamber, the capture body comprising a sorbent material that captures carbon dioxide, with the sorbent material hanging from at least one collapsible tether;
- moving the capture body into a release configuration by moving the capture body into the harvest chamber, with the portion of the capture body holding captured carbon dioxide entering the harvest chamber through a first opening of the harvest chamber;
- regenerating the sorbent material and releasing the captured carbon dioxide into the harvest chamber to form an enriched gas by exposing the sorbent material to a release medium introduced to the harvest chamber by a sorbent regeneration system; and
- removing a product stream of enriched gas from the harvest chamber through a product outlet.

12. The method of claim 11, wherein the capture body is moved using a support structure coupled to the capture body and driven by a control system communicatively coupled to the support structure.

13. The method of claim 11, wherein the release medium being one of liquid water and steam.

14. The method of claim 13, further comprising extracting the release medium in liquid form from the harvest chamber using a liquid extractor.

15. The method of claim 11, wherein the product stream of enriched gas is removed from the harvest chamber by displacing the enriched gas with a sweep gas.

16. The method of claim 11, wherein the capture body comprises a plurality of plates, and wherein the plurality of plates are enclosed within the harvest chamber when the capture body is in the release configuration, each plate comprising the sorbent material.

17. A system for passive collection of atmospheric carbon dioxide, comprising:
- a harvest chamber comprising a first opening and a sorbent regeneration system;
- a capture body coupled to the harvest chamber and comprising a plurality of plates, each plate comprising a sorbent material, the capture body movable between a collection configuration wherein at least a portion of the capture body is outside the harvest chamber and in contact with an airflow such that atmospheric carbon dioxide is captured by the sorbent material, and a release configuration wherein the plurality of plates are enclosed within the harvest chamber and the capture body is operated upon by the sorbent regeneration system inside the harvest chamber such that captured carbon dioxide is released into the harvest chamber to form an enriched gas; and
- a product outlet in fluid communication with the inside of the harvest chamber and configured to receive a product stream of enriched gas.

18. The system of claim 17, wherein the plurality of plates are coupled to and spaced out along a collapsible tether such that the plurality of plates hangs by the tether when the capture body is in the collection configuration.

* * * * *